US008306991B2

(12) United States Patent
Borthakur et al.

(10) Patent No.: US 8,306,991 B2
(45) Date of Patent: Nov. 6, 2012

(54) SYSTEM AND METHOD FOR PROVIDING A PROGRAMMING-LANGUAGE-INDEPENDENT INTERFACE FOR QUERYING FILE SYSTEM CONTENT

(75) Inventors: Dhrubajyoti Borthakur, San Jose, CA (US); Nur Premo, San Jose, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1571 days.

(21) Appl. No.: 10/862,504

(22) Filed: Jun. 7, 2004

(65) Prior Publication Data
US 2006/0004709 A1    Jan. 5, 2006

(51) Int. Cl.
G06F 7/00 (2006.01)
G06F 17/30 (2006.01)
(52) U.S. Cl. .................. 707/760; 707/736; 707/713
(58) Field of Classification Search .............. 707/3, 100, 707/4, 200
See application file for complete search history.

(56) References Cited

U.S. PATENT DOCUMENTS

| | | | |
|---|---|---|---|
| 5,623,657 A | 4/1997 | Conner | |
| 5,907,837 A | 5/1999 | Ferrell | |
| 6,026,474 A | 2/2000 | Carter | |
| 6,078,743 A * | 6/2000 | Apte et al. | 717/100 |
| 6,240,401 B1 | 5/2001 | Oren et al. | |
| 6,240,429 B1 | 5/2001 | Thornton et al. | |
| 6,286,013 B1 | 9/2001 | Reynolds et al. | |
| 6,374,260 B1 | 4/2002 | Hoffert et al. | |
| 6,389,538 B1 | 5/2002 | Gruse et al. | |
| 6,522,268 B2 | 2/2003 | Belu | |
| 6,799,184 B2 * | 9/2004 | Bhatt et al. | 707/102 |
| 6,842,758 B1 * | 1/2005 | Bogrett | 707/103 R |
| 6,938,083 B1 | 8/2005 | Teague | |
| 6,970,866 B1 | 11/2005 | Pravetz | |
| 6,976,241 B2 * | 12/2005 | Cruz et al. | 717/102 |
| 7,013,331 B2 | 3/2006 | Das | |
| 7,020,658 B1 | 3/2006 | Hill | |
| 7,058,624 B2 | 6/2006 | Masters | |
| 7,127,469 B2 * | 10/2006 | Lindblad et al. | 1/1 |

(Continued)

OTHER PUBLICATIONS

The VLDB Journal—The International Journal on Very Large Data Bases: vol. 11 Issue 4, Dec. 2002: Springer-Verlag New York, Inc. Secaucus, NJ, USA.*

(Continued)

Primary Examiner — Rehana Perveen
Assistant Examiner — Raheem Hoffler
(74) Attorney, Agent, or Firm — Meyertons Hood Kivlin Kowert & Goetzel; Anthony M. Petro (57) ABSTRACT

A system and method for providing a programming-language-independent interface for querying file system content. In one embodiment, the system may include a storage device configured to store a plurality of files and a file system configured to manage access to the storage device and to store file system content. The file system may include a programming-language-independent interface whereby an application queries the file system content. In various specific implementations of the system, file system content may include file data stored in one or more of the plurality of files, or metadata stored in a named stream corresponding to a given file, respectively. In another specific implementation of the system, the application querying file system content may include the application generating a query in a query language, the application submitting the query to a query engine via the programming-language-independent interface, and the query engine evaluating said query.

20 Claims, 4 Drawing Sheets

U.S. PATENT DOCUMENTS

| | | | |
|---|---|---|---|
| 7,188,118 | B2 | 3/2007 | Borthakur et al. |
| 7,246,104 | B2 * | 7/2007 | Stickler ................................. 1/1 |
| 7,441,238 | B2 * | 10/2008 | Zatloukal ...................... 717/140 |
| 7,596,568 | B1 * | 9/2009 | McConnell ........................... 1/1 |
| 2001/0025311 | A1 | 9/2001 | Arai et al. |
| 2002/0049731 | A1 | 4/2002 | Kotani |
| 2003/0093556 | A1 | 5/2003 | Yeung et al. |
| 2003/0151633 | A1 | 8/2003 | George et al. |
| 2003/0154271 | A1 | 8/2003 | Baldwin |
| 2003/0172368 | A1 | 9/2003 | Alumbaugh et al. |
| 2004/0002942 | A1 | 1/2004 | Pudipeddi et al. |
| 2004/0059866 | A1 | 3/2004 | Patel et al. |
| 2004/0148278 | A1 * | 7/2004 | Milo et al. ......................... 707/3 |
| 2004/0186857 | A1 * | 9/2004 | Serlet et al. ................... 707/200 |
| 2004/0215600 | A1 * | 10/2004 | Aridor et al. ....................... 707/3 |
| 2004/0225730 | A1 | 11/2004 | Brown |
| 2004/0225865 | A1 * | 11/2004 | Cox et al. ......................... 712/34 |
| 2004/0243554 | A1 | 12/2004 | Broder |
| 2005/0015461 | A1 | 1/2005 | Richard et al. |
| 2005/0038813 | A1 | 2/2005 | Apparao et al. |
| 2005/0060561 | A1 * | 3/2005 | Pearson et al. ................ 713/194 |
| 2005/0073982 | A1 * | 4/2005 | Corneille et al. ............. 370/338 |
| 2005/0114363 | A1 | 5/2005 | Borthakur et al. |
| 2005/0114381 | A1 | 5/2005 | Borthakur et al. |
| 2005/0114406 | A1 | 5/2005 | Borthakur et al. |
| 2005/0131955 | A1 * | 6/2005 | Borthakur et al. ............ 707/200 |
| 2005/0160322 | A1 * | 7/2005 | West et al. ....................... 714/38 |
| 2005/0198010 | A1 | 9/2005 | Borthakur |
| 2006/0004759 | A1 | 1/2006 | Borthakur et al. |
| 2006/0004787 | A1 | 1/2006 | Borthakur et al. |
| 2006/0074912 | A1 | 4/2006 | Borthakur |
| 2006/0212593 | A1 * | 9/2006 | Patrick et al. ................. 709/230 |

OTHER PUBLICATIONS

"The Business Rationale for Distributed (Remote) Document Capture," Verity White-Paper, Oct. 2003, downloaded from http://www.cardiff.com/cms/groups/public/documents/collateral/mk0535.pdf, 12 pages.

Autonomy XML WhitePaper, Oct. 2003, downloaded from http://www.autonomy.com/content/downloads/White%20Papers/index.en.html, 11 pages.

Auttonomy Technology White Paper, Nov. 2003, downloaded from http://www.autonomy.com/content/downloads/White%20Papers/index.en.html, 19 pages.

"DCMI Abstract Data Model," Dublin Core Metadata Initiative, Feb. 2004, downloaded from http://www.ukoln,ac.uk/metadata/dcmi/abstract-model/2004-02-04/, 17 pages.

Staples et al., "The Fedora Project: An Open-source Digital Object Repository Management System," in D-Llb Magazine, v. 9, No. 4, Apr. 2003, downloaded from http://web.archive.org/web/20040203065018/www.dlib.org/dlib/april03/staples/04staples.html, 12 pages.

"The Business Raionale for Distributed (Remote) Document Capture," Verity White Paper, Oct. 2003, downloaded from http://www.cardiff.com/cms/groups/public/documents/collateral/mk0535.pdf, 12 pages.

"Native XML Management With Documentum," Documentum Technical White Paper, Jul. 2003, downloaded from http://software.emc.com/collateral/content_management/documentum_family/wp_tech_xml.pdf, 15 pages.

Autonomy XML White Paper, Oct. 2003, downloaded from http://www.autonomy.com/content/downloads/White%20Papers/index.en.html, 11 pages.

Autonomy Technology White Paper, Nov. 2003, downloaded from http://www.autonomy.com/content/downloads/White%20Papers/index.en.html, 19 pages.

"DCMI Abstract Data Model," Dublin Core Metadata Initiative, Feb. 2004, downloaded from http://www.ukoln.ac.uk/metadata/dcmi/abstract-model/2004-02-04/, 17 pages.

Staples et al., "The Fedora Project: An Open-source Digital Object Repository Management System," in D-Lib Magazine, v. 9, No. 4, Apr. 2003, downloaded from http://web.archive.org/web/20040203065018/www.dlib.org/dlib/april03/staples/04staples.html, 12 pages.

Wildermuth, "A Developer's Perspective on WinFS: Part 1," Mar. 2004, downloaded from http://web.archive.org/web/20050414063209/http://msdn.microsoft.com/data/winfs/default.aspx?pull=/library/en-us/dnwinfsta/html/winfsdevpersp.asp, 10 pages.

* cited by examiner

SYSTEM AND METHOD FOR PROVIDING A PROGRAMMING-LANGUAGE-INDEPENDENT INTERFACE FOR QUERYING FILE SYSTEM CONTENT

BACKGROUND OF THE INVENTION

1. Field of the Invention

This invention relates to computer systems and, more particularly, to file-based storage systems.

2. Description of the Related Art

Computer systems often process large quantities of information, including application data and executable code configured to process such data. In numerous embodiments, computer systems provide various types of mass storage devices configured to store data, such as magnetic and optical disk drives, tape drives, etc. To provide a regular and systematic interface through which to access their stored data, such storage devices are frequently organized into hierarchies of files by software such as an operating system. Often a file defines a minimum level of data granularity that a user can manipulate within a storage device, although various applications and operating system processes may operate on data within a file at a lower level of granularity than the entire file.

In some file-based computer systems, various types of information about files, also referred to as metadata, may be stored in addition to the files themselves. However, in typical conventional computer systems, access to files and their metadata by application software is provided by an interface specific to a particular programming language, operating system, or hardware architecture. In such systems, for applications using a new programming language, operating system, or hardware architecture to be given access to files and metadata, a separate interface may need to be provided. Further, such interfaces may vary substantially according to the type of data access desired, the programming language used, or other factors.

Creating and supporting new interfaces may require additional programmer effort, such as coding and verification effort. Further, as types of interfaces multiply, the effort required to maintain them over time increases. Additionally, if a unique interface is provided for each programming language, operating system, or architecture scenario, such interfaces may diverge considerably in their support for various features of file and metadata access. For example, not all interfaces may provide all programming languages the same level of access to file data and metadata. Some interfaces may require a programmer to engage in numerous platform-specific preliminary steps to initialize and prepare for accessing data before any actual data transfer is performed. Such divergence among interfaces may complicate the application programming task and hinder acceptance of a given file content format among developers.

SUMMARY OF THE INVENTION

Various embodiments of a system and method for providing a programming-language-independent interface for querying file system content are disclosed. In one embodiment, the system may include a storage device configured to store a plurality of files and a file system configured to manage access to the storage device and to store file system content. The file system may include a programming-language-independent interface whereby an application queries the file system content.

In various specific implementations of the system, file system content may include file data stored in one or more of the plurality of files, or metadata stored in a named stream corresponding to a given file, respectively. In another specific implementation of the system, the application querying file system content may include the application generating a query in a query language, the application submitting the query to a query engine via the programming-language-independent interface, and the query engine evaluating said query.

A method is also contemplated which, in one embodiment, may include storing file system content and querying the file system content via a programming-language-independent interface.

In another aspect of the invention, a system is disclosed that may include a storage device configured to store a plurality of files and a file system configured to manage access to the storage device and to store file system content. The file system may include an XML Query (XQuery) query language interface whereby an application queries the file system content.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Storage System and File System Overview

Figure 1:
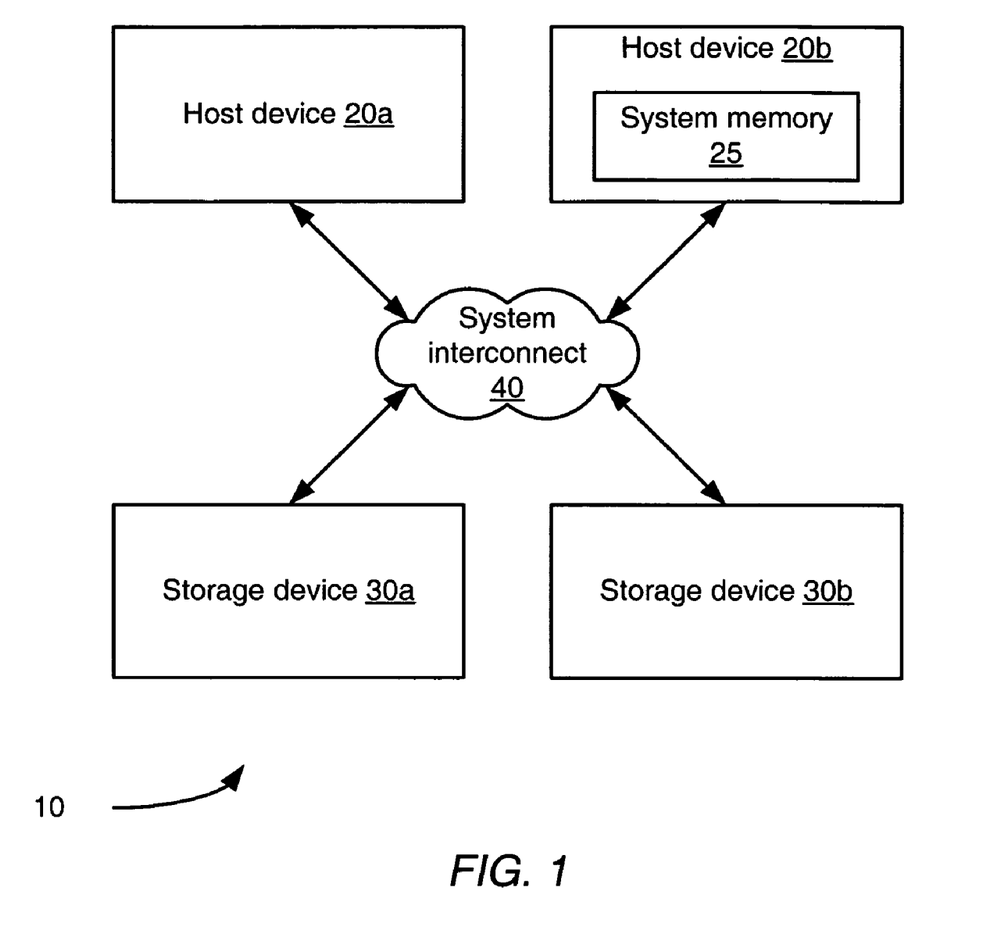
FIG. 1 is a block diagram illustrating one embodiment of a storage system.

Turning now to FIG. 1, a block diagram of one embodiment of a storage system is shown. In the illustrated embodiment, storage system 10 includes a plurality of host devices 20a and 20b coupled to a plurality of storage devices 30a and 30b via a system interconnect 40. Further, host device 20b includes a system memory 25 in the illustrated embodiment. For simplicity of reference, elements referred to herein by a reference number followed by a letter may be referred to collectively by the reference number alone. For example, host devices 20a and 20b and storage devices 30a and 30b may be referred to collectively as host devices 20 and storage devices 30.

In various embodiments of storage system 10, host devices 20 may be configured to access data stored on one or more of storage devices 30. In one embodiment, storage system 10 may be implemented within a single computer system, for example as an integrated storage server. In such an embodiment, for example, host devices 20 may be individual processors, system memory 25 may be a cache memory such as a static RAM (SRAM), storage devices 30 may be mass storage devices such as hard disk drives or other writable or rewritable media, and system interconnect 40 may include a peripheral bus interconnect such as a Peripheral Component Interface (PCI) bus. In some such embodiments, system interconnect 40 may include several types of interconnect between host devices 20 and storage devices 30. For example, system interconnect 40 may include one or more processor buses (not shown) configured for coupling to host devices 20, one or more bus bridges (not shown) configured to couple the processor buses to one or more peripheral buses, and one or more storage device interfaces (not shown) configured to couple the peripheral buses to storage devices 30. Storage device interface types may in various embodiments include the Small Computer System Interface (SCSI), AT Attachment Packet Interface (ATAPI), Firewire, and/or Universal Serial Bus (USB), for example, although numerous alternative embodiments including other interface types are possible and contemplated.

In an embodiment of storage system 10 implemented within a single computer system, storage system 10 may be configured to provide most of the data storage requirements for one or more other computer systems (not shown), and may be configured to communicate with such other computer systems. In an alternative embodiment, storage system 10 may be configured as a distributed storage system, such as a storage area network (SAN), for example. In such an embodiment, for example, host devices 20 may be individual computer systems such as server systems, system memory 25 may be comprised of one or more types of dynamic RAM (DRAM), storage devices 30 may be standalone storage nodes each including one or more hard disk drives or other types of storage, and system interconnect 40 may be a communication network such as Ethernet or Fibre Channel. A distributed storage configuration of storage system 10 may facilitate scaling of storage system capacity as well as data bandwidth between host and storage devices.

In still another embodiment, storage system 10 may be configured as a hybrid storage system, where some storage devices 30 are integrated within the same computer system as some host devices 20, while other storage devices 30 are configured as standalone devices coupled across a network to other host devices 20. In such a hybrid storage system, system interconnect 40 may encompass a variety of interconnect mechanisms, such as the peripheral bus and network interconnect described above.

It is noted that although two host devices 20 and two storage devices 30 are illustrated in FIG. 1, it is contemplated that storage system 10 may have an arbitrary number of each of these types of devices in alternative embodiments. Also, in some embodiments of storage system 10, more than one instance of system memory 25 may be employed, for example in other host devices 20 or storage devices 30. Further, in some embodiments, a given system memory 25 may reside externally to host devices 20 and storage devices 30 and may be coupled directly to a given host device 20 or storage device 30 or indirectly through system interconnect 40.

In many embodiments of storage system 10, one or more host devices 20 may be configured to execute program instructions and to reference data, thereby performing a computational function. In some embodiments, system memory 25 may be one embodiment of a computer-accessible medium configured to store such program instructions and data. However, in other embodiments, program instructions and/or data may be received, sent or stored upon different types of computer-accessible media. Generally speaking, a computer-accessible medium may include storage media or memory media such as magnetic or optical media, e.g., disk or CD-ROM included in storage system 10 as storage devices 30. A computer-accessible medium may also include volatile or non-volatile media such as RAM (e.g. SDRAM, DDR SDRAM, RDRAM, SRAM, etc.), ROM, etc, that may be included in some embodiments of storage system 10 as system memory 25. Further, a computer-accessible medium may include transmission media or signals such as electrical, electromagnetic, or digital signals, conveyed via a communication medium such as network and/or a wireless link, which may be included in some embodiments of storage system 10 as system interconnect 40.

In some embodiments, program instructions and data stored within a computer-accessible medium as described above may implement an operating system that may in turn provide an environment for execution of various application programs. For example, a given host device 20 may be configured to execute a version of the Microsoft Windows operating system, the Unix/Linux operating system, the Apple Macintosh operating system, or another suitable operating system. Additionally, a given host device may be configured to execute application programs such as word processors, web browsers and/or servers, email clients and/or servers, and multimedia applications, among many other possible applications.

During execution on a given host device 20, either the operating system or a given application may generate requests for data to be loaded from or stored to a given storage device 30. For example, code corresponding to portions of the operating system or an application itself may be stored on a given storage device 30, so in response to invocation of the desired operation system routine or application program, the corresponding code may be retrieved for execution. Similarly, operating system or application execution may produce data to be stored.

Many operating system embodiments provide data and control structures for organizing the storage space provided by storage devices 30 into files. In various embodiments, the data structures may include one or more tables configured to store information such as, for example, the identity of each file, its location within storage devices 30 (e.g., a mapping to a particular physical location within a particular storage device), as well as other information about each file as described in greater detail below. Also, in various embodiments, the control structures may include executable routines for manipulating files, such as, for example, function calls for changing file identity and for modifying file content as described in greater detail below. Collectively, these data and control structures may be referred to herein as a file system, and the particular data formats and protocols implemented by a given file system may be referred to herein as the format of the file system.

In some embodiments, a file system may be integrated into the operating system such that any access to data stored on storage devices 30 is governed by the control and data structures of the file system. Different operating systems may implement different native file systems using different formats, but in some embodiments, a given operating system may include a file system that supports multiple different types of file system formats, including file system formats native to other operating systems. In such embodiments, the various file system formats supported by the file system may be referred to herein as local file systems. Additionally, in some embodiments, a file system may be implemented using multiple layers of functionality arranged in a hierarchy, as illustrated in FIG. 2.

Figure 2:
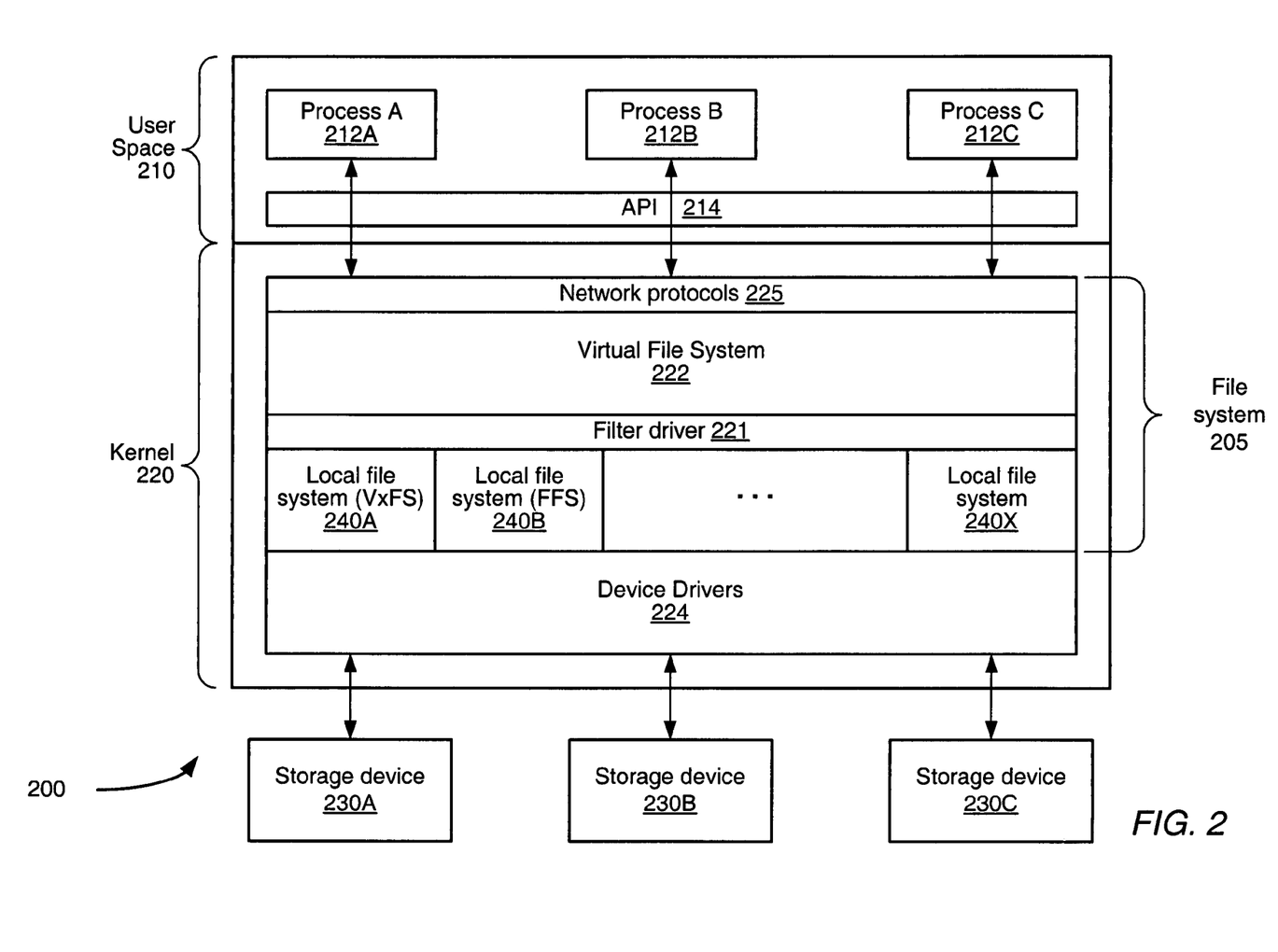
FIG. 2 is a block diagram illustrating one embodiment of an operating system architecture and its interface to storage devices.

FIG. 2 illustrates one embodiment of an operating system architecture and its interface to storage devices. In the illustrated embodiment, operating system 200 includes a user space 210 and a kernel space 220. User space 210 includes a plurality of processes 212A-C, each of which may correspond to a given user application. In some embodiments, some application processes 212 within user space 210 may be distinct from operating system 200. Such processes may be said to operate within an environment provided by operating system 200, or to operate "on top of" operating system 200. Each of processes 212 may be configured to access storage devices 230A-C through calls to application programming interface (API) 214. API 214 provides processes 212 with access to file system 205, which is configured to operate within kernel space 220. In one embodiment, storage devices 230 may be illustrative of storage devices 30 of FIG. 1. Also, in one embodiment, operating system 200, any of its components, and/or any of processes 212 may be configured to execute on one or more host devices 20 of FIG. 1, for example as program instructions and data stored within a computer-accessible medium such as system memory 25 of FIG. 1.

As described above with respect to storage system 10 of FIG. 1, a given host device 20 may reside in a different computer system from a given storage device 30, and may access that storage device via a network. Likewise, with respect to operating system 200, in one embodiment a given process such as process 212A may execute remotely and may access storage devices 230 over a network. In the illustrated embodiment, file system 200 includes network protocols 225 to support access to the file system by remote processes. In some embodiments, network protocols 225 may include support for the Network File System (NFS) protocol or the Common Internet File System (CIFS) protocol, for example, although it is contemplated that any suitable network protocol may be employed, and that multiple such protocols may be supported in some embodiments.

File system 205 may be configured to support a plurality of local file systems. In the illustrated embodiment, file system 205 includes a VERITAS (VxFS) format local file system 240A, a fast file system (FFS) format local file system 240B, and a proprietary (X) format local file system 240X. However, it is contemplated that in other embodiments, any number or combination of local file system formats may be supported by file system 205. To provide a common interface to the various local file systems 240, file system 205 includes a virtual file system 222. In one embodiment, virtual file system 222 may be configured to translate file system operations originating from processes 212 to a format applicable to the particular local file system 240 targeted by each operation. Additionally, in the illustrated embodiment operating system 200 includes device drivers 224 through which local file systems 240 may access storage devices 230. Device drivers 224 may implement data transfer protocols specific to the types of interfaces employed by storage devices 230. For example, in one embodiment device drivers 224 may provide support for transferring data across SCSI and ATAPI interfaces, though in other embodiments device drivers 224 may support other types and combinations of interfaces.

In the illustrated embodiment, file system 205 also includes filter driver 221. In some embodiments, filter driver 221 may be configured to monitor each operation entering file system 205 and, subsequent to detecting particular types of operations, to cause additional operations to be performed or to alter the behavior of the detected operation. For example, in one embodiment filter driver 221 may be configured to combine multiple write operations into a single write operation to improve file system performance. In another embodiment, filter driver 221 may be configured to compute a signature of a file subsequent to detecting a write to that file. In still another embodiment, filter driver 221 may be configured to store information, such as records, associated with particular files subsequent to detecting certain kinds of operations on those files, as described in greater detail below. It is contemplated that in some embodiments, filter driver 221 may be configured to implement one or more combinations of the aforementioned operations, including other filter operations not specifically mentioned.

It is noted that filter driver 221 is part of file system 205 and not an application or process within user space 210. Consequently, filter driver 221 may be configured to operate independent of applications and processes within the user space 210. Alternatively, or in addition to the above, filter driver 221 may be configured to perform operations in response to requests received from applications or processes within the user space 210.

It is further noted that in some embodiments, kernel space 220 may include processes (not shown) that generate accesses to storage devices 230, similar to user space processes 212. In such embodiments, processes executing in kernel space 220 may be configured to access file system 205 through a kernel-mode API (not shown), in a manner similar to user space processes 212. Thus, in some embodiments, all accesses to storage devices 230 may be processed by file system 205, regardless of the type or space of the process originating the access operation.

Numerous alternative embodiments of operating system 200 and file system 205 are possible and contemplated. For example, file system 205 may support different numbers and formats of local file systems 240, or only a single local file system 240. In some embodiments, network protocol 225 may be omitted or integrated into a portion of operating system 200 external to file system 205. Likewise, in some embodiments virtual file system 222 may be omitted or disabled, for example if only a single local file system 240 is in use. Additionally, in some embodiments filter driver 221 may be implemented within a different layer of file system 205. For example, in one embodiment, filter driver 221 may be integrated into virtual file system 222, while in another embodiment, an instance of filter driver 221 may be implemented in each of local file systems 240.

Files and Metadata

As described above, file system 205 may be configured to manage access to a plurality of files stored on storage devices 230. In many embodiments, each stored file may have an associated identity used by the file system to distinguish each file from other files. In one embodiment of file system 205, the identity of a file may be a file name, which may for example include a string of characters such as "filename.txt". However, in embodiments of file system 205 that implement a file hierarchy, such as a hierarchy of folders or directories, all or part of the file hierarchy may be included in the file identity. For example, a given file named "file1.txt" may reside in a directory "smith" that in turn resides in a directory "users". The directory "users" may reside in a directory "test1" that is a top-level or root-level directory within file system 205. In some embodiments, file system 205 may define a single "root directory" to include all root-level directories, where no higher-level directory includes the root directory. In other embodiments, multiple top-level directories may coexist such that no higher-level directory includes any top-level directory. The names of the specific folders or directories in which a given file is located may be referred to herein as the given file's path or path name.

In some embodiments of file system 205 that implement a file hierarchy, a given file's identity may be specified by listing each directory in the path of the file as well as the file name. Referring to the example given above, the identity of the given instance of the file named "file1.txt" may be specified as "/test1/users/smith/file1.txt". It is noted that in some embodiments of file system 205, a file name alone may be insufficient to uniquely identify a given file, whereas a fully specified file identity including path information may be sufficient to uniquely identify a given file. There may, for example, exist a file identified as "/test2/users/smith/file1.txt" that, despite sharing the same file name as the previously mentioned file, is distinct by virtue of its path. It is noted that other methods of representing a given file identity using path and file name information are possible and contemplated. For example, different characters may be used to delimit directory/folder names and file names, or the directory/folder names and file names may be specified in a different order.

The files managed by file system 205 may store application data or program information, which may collectively be referred to as file data, in any of a number of encoding formats. For example, a given file may store plain text in an ASCII-encoded format or data in a proprietary application format, such as a particular word processor or spreadsheet encoding format. Additionally, a given file may store video or audio data or executable program instructions in a binary format. It is contemplated that numerous other types of data and encoding formats, as well as combinations of data and encoding formats, may be used in files as file data. In addition to managing access to storage devices, the various files stored on storage devices, and the file data in those files as described above, in some embodiments file system 205 may be configured to store information corresponding to one or more given files, which information may be referred to herein as metadata. Generally speaking, metadata may encompass any type of information associated with a file. In various embodiments, metadata may include information such as (but not limited to) the file identity, size, ownership, and file access permissions. Metadata may also include free-form or user-defined data such as records corresponding to file system operations, as described in greater detail below. Metadata corresponding to a file as well as the data content of files may collectively be referred to herein as file system content.

In some embodiments, file system 205 may be configured to provide an application-language independent query interface whereby an application may query file system content. For example, in one embodiment file system content may be stored along with tags that describe various aspects of the content, as described in greater detail below. In such an embodiment, an application may be configured to query the file system content in order to identify specific content according to various specified tag values. For example, an application may query the file system content to identify all files written by a particular application within a certain date range.

Figure 3:
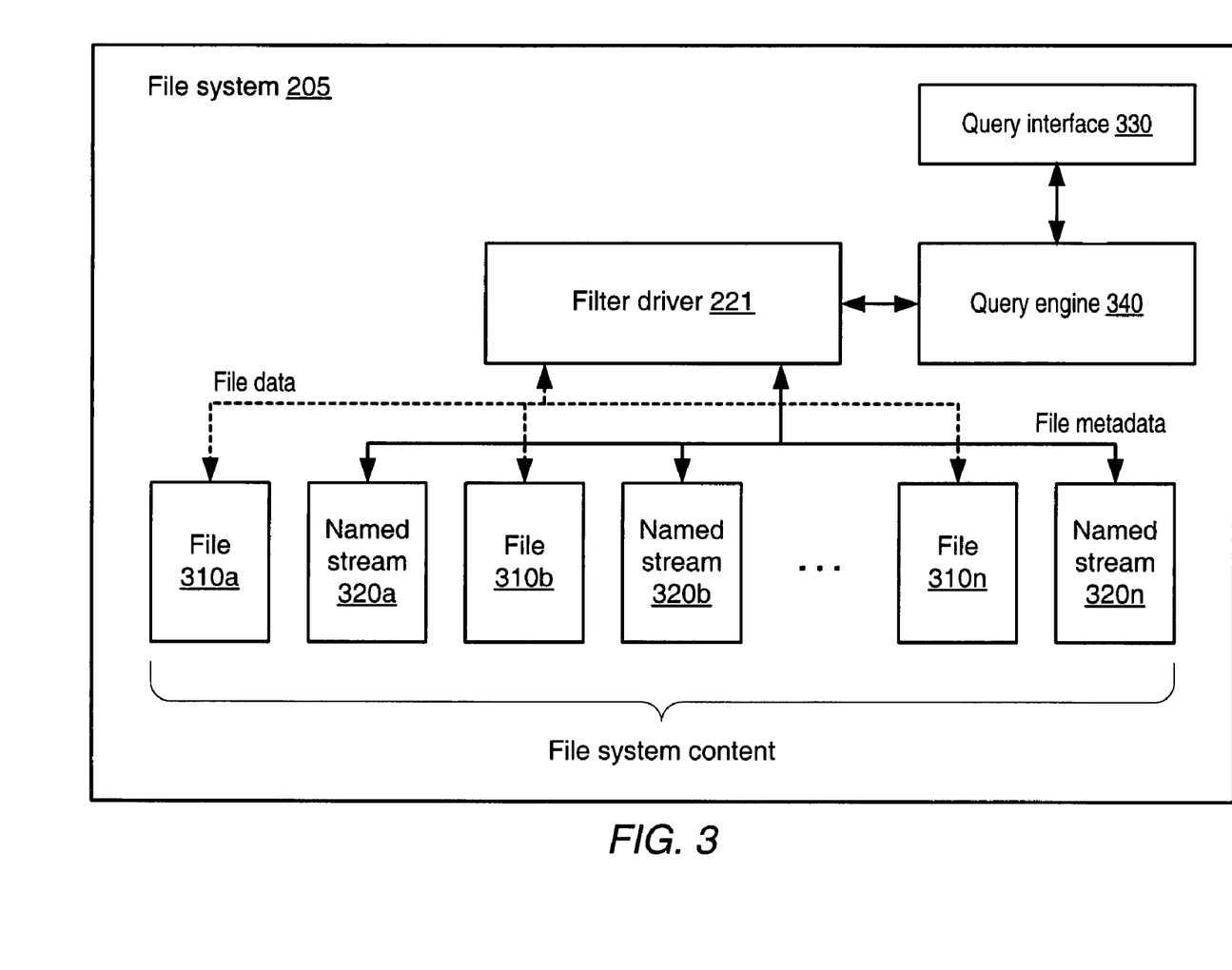
FIG. 3 is a block diagram illustrating one embodiment of a file system configured to query file system content.

FIG. 3 illustrates one embodiment of a file system configured to store file system content and to provide a query interface to such content. The embodiment of file system 205 shown in FIG. 3 may include those elements illustrated in the embodiment of FIG. 2; however, for sake of clarity, some of these elements are not shown. In the illustrated embodiment, file system 205 includes filter driver 221, an arbitrary number of files 310*a-n*, and a respective named stream 320*a-n* associated with each of files 310*a-n*. File system 205 further includes a query interface 330 and a query engine 340. It is noted that a generic instance of one of files 310*a-n* or named streams 320*a-n* may be referred to respectively as a file 310 or a named stream 320, and that files 310*a-n* and named streams 320*a-n* may be referred to collectively as files 310 and named streams 320, respectively. As noted above, files 310 and named streams 320 may collectively be referred to as file system content.

Files 310 may be representative of files managed by file system 205, and may in various embodiments be configured to store various types of data and program instructions as described above. In the illustrated embodiment, each of files 310 has a corresponding named stream 320. Each of named streams 320 may be configured to store metadata pertaining to its corresponding file. It is noted that files 310 and named streams 320 may be physically stored on one or more storage devices, such as storage devices 230 of FIG. 2. However, for purposes of illustration, files 310 and named streams 320 are shown as conceptually residing within file system 205.

In some embodiments, filter driver 221 may be configured to access file data stored in a given file 310. For example, filter driver 221 may be configured to detect read and/or write operations received by file system 205, and may responsively cause file data to be read from or written to a given file 310 corresponding to the received operation. In some embodiments, filter driver 221 may be configured to generate metadata corresponding to a given file 310 and store the generated metadata in the corresponding named stream 320. For example, upon detecting a file write operation directed to given file 310, filter driver 221 may be configured to update metadata corresponding to the last modified time of given file 310 and to store the updated metadata within named stream 320. Also, in some embodiments filter driver 221 may be configured to retrieve metadata corresponding to a specified file on behalf of a particular application.

Metadata also may be generated in response to various types of file system activity initiated by operating system 200 or processes 212 of FIG. 2. In some embodiments, the generated metadata may include records of arbitrary complexity. For example, in one embodiment filter driver 221 may be configured to detect various types of file manipulation operations such as file create, delete, rename, and/or copy operations as well as file read and write operations. After detecting a particular file operation, filter driver 221 may be configured to generate a record of the operation and store the record in the appropriate named stream 320 as metadata of the file 310 targeted by the operation.

The stored metadata record may in various embodiments include various kinds of information about the file 310 and the operation detected, such as the identity of the process generating the operation, file identity, file type, file size, file owner, and/or file permissions, for example. In one embodiment, the record may include a file signature indicative of the content of file 310. A file signature may be a hash-type function of all or a portion of the file contents and may have the property that minor differences in file content yield quantifiably distinct file signatures. For example, the file signature may employ the Message Digest 5 (MD5) algorithm, which may yield different signatures for files differing in content by as little as a single bit, although it is contemplated that any suitable signature-generating algorithm may be employed. The record may also include additional information not specifically listed.

In one embodiment, the metadata record stored by filter driver 221 subsequent to detecting a particular file operation may be generated and stored in a format that may include data fields along with tags that describe the significance of an associated data field. Such a format may be referred to as a "self-describing" data format. In one embodiment, Extensible Markup Language (XML) format may be used as a self-describing format for storing metadata records, although it is contemplated that in other embodiments, any suitable format may be used, including formats that are not self-describing.

XML-format records may allow arbitrary definition of record fields, according to the desired metadata to be recorded. One example of an XML-format record is as follows:

```
<record sequence="1">
    <path>/test1/foo.pdf</path>
    <type>application/pdf</type>
    <user id=1598>username</user>
    <group id=119>groupname</group>
    <perm>rw-r--r--</perm>
    <md5>d41d8cd98f00b204e9800998ecf8427e</md5>
    <size>0</size>
</record>
```

Such a record may be appended to the named stream (for example, named stream 320a) associated with the file (for example, file 310a) having the file identity "/test1/foo.pdf" subsequent to, for example, a file create operation. In this case, the number associated with the "record sequence" field indicates that this record is the first record associated with file 310a. The "path" field includes the file identity, and the "type" field indicates the file type, which in one embodiment may be provided by the process issuing the file create operation, and in other embodiments may be determined from the extension of the file name or from header information within the file, for example. The "user id" field records both the numerical user id and the textual user name of the user associated with the process issuing the file create operation, and the "group id" field records both the numerical group id and the textual group name of that user. The "perm" field records file permissions associated with file 310a in a format specific to the file system 205 and/or the operating system. The "md5" field records an MD5 signature corresponding to the file contents, and the "size" field records the length of file 310a in bytes. It is contemplated that in alternative embodiments, filter driver 221 may store records corresponding to detected operations where the records include more or fewer fields, as well as fields having different definitions and content. It is also contemplated that in some embodiments filter driver 221 may encapsulate data read from a given file 310 within the XML format, such that read operations to files may return XML data regardless of the underlying file data format. Likewise, in some embodiments filter driver 221 may be configured to receive XML format data to be written to a given file 310. In such an embodiment, filter driver 221 may be configured to remove XML formatting prior to writing the file data to given file 310.

It is noted that in some embodiments, metadata may be stored in a structure other than a named stream. For example, in one embodiment metadata corresponding to one or more files may be stored in another file in a database format or another format. Also, it is contemplated that in some embodiments, other software modules or components of file system 205 may be configured to generate, store, and/or retrieve metadata. For example, the metadata function of filter driver 221 may be incorporated into or duplicated by another software module.

Querying File System Content

As described above, in some embodiments file system 205 may be configured to store various types of file system content. File system 205 may store numerous types of file data within one or more files, and may store metadata of arbitrary complexity corresponding to a given file. File system 205 may also be configured to consume file system content. For example, file system 205 may implement particular storage policies whereby files having certain usage characteristics as indicated in their metadata are assigned to particular types of storage. In one embodiment, for example, files that are more recently used or are accessed by certain types of processes may be assigned to faster types of storage, whereas other files may be assigned to slower storage.

In some embodiments, application or operating system processes external to file system 205 (such as processes 212 of FIG. 2) may also be configured to consume file system content. For example, a programmer writing an application software module may wish to create and manipulate specific files and their associated file data in order to store or retrieve application data. Additionally, such a programmer may wish to perform actions contingent on the metadata characteristics of certain files, such as configuring a backup program to select only files that have been modified since the time of the last backup. In some embodiments, API 214 of FIG. 2 may provide an interface of function calls whereby an application process 212 may interact with file system 205 to interact with file system content.

In embodiments where file system content is stored in a self-describing format, such as the XML format described above, a process or application may be configured to select the desired file system content by performing a query of the file system content using the self-describing features of that content. Generally speaking, a query may specify how a subset of data is to be selected from a larger set of data, such as through the evaluation of one or more data fields of a record stored in a self-describing format. For example, a user may wish to select all stored records that correspond to the file/test1/foo.pdf for further analysis. Correspondingly, the user may construct a query that specifies the selection of all records having a data field tagged "path" where the data field equals a particular value, such as "/test1/foo.pdf".

Queries may be constructed in a query language, which may provide syntactic constructs for the selection of sets of data based on the value of one or more tagged data fields. In some embodiments, a given query language may support procedural features, such as functions, for example, in addition to set-selection features. Further, in some embodiments a given query language may support the embedding within a query of procedural routines coded in other programming languages, such as Java or C, for example. Where the XML format is used to structure file system content, a given application may construct a query to select particular file system content in the XML Query (XQuery) language as specified by the World Wide Web Consortium (W3C) or any future XQuery standard or variant thereof. However, it is contemplated that any suitable query language may be employed.

In the illustrated embodiment, queries may be submitted to query engine 340 for evaluation. Query engine 340 may parse and evaluate received queries, and may coordinate with filter driver 221 to retrieve file system content corresponding to a particular query. Query engine 340 may then cause these query results to be conveyed to the application originating the query. It is noted that in one embodiment, query engine 340 may be configured to operate in the user space illustrated in FIG. 2, rather than in kernel space.

In some conventional embodiments, applications may submit queries to query engine 340 through a specific API configured to provide database-type connectivity to applications, such as the Java Database Connectivity (JDBC) standard API or the Open Database Connectivity (ODBC) standard API. Such APIs typically provide applications with a set of function calls, methods, or other interface mechanisms whereby an application may connect to a query engine, authenticate itself as authorized to submit queries, and actually convey queries to the query engine, among other types of activities.

However, such query APIs are typically specific to a particular programming language, operating system, and/or hardware architecture. For example, in one embodiment the query API presented to a given application may consist of language-specific interface mechanisms, such as library or stub files written to interface with applications coded in particular languages, such as C, Java, or another language. Augmenting the query API to support applications written in languages not currently supported may require the coding of an additional API targeted to the desired language.

Further, in some embodiments, a given query API may reflect specific underlying characteristics of an operating system or hardware architecture, and in some instances where file system 205 supports interfaces to different operating systems or architectures, multiple query APIs may be required even for the same target application language. For example, some hardware architectures may use different byte ordering conventions (e.g., "endianness") for data storage, requiring API libraries and/or stub files conforming to each desired byte ordering convention.

Finally, conventional query APIs may require application programmers to understand not only the syntax and semantics of the query language in which queries will be formed and submitted to query engine 340, but also the syntax and semantics of a particular query API which may differ according to the programming language or operating system. For example, the JDBC and ODBC query APIs each specify a set of functional procedures by which a user may connect to a query engine and authenticate itself. However, such procedures may be merely preliminary to the actual formation and submission of a query, and if the identical query were to be performed in an application coded in a different language or for a different platform, different preliminaries might need to be employed prior to submission of the query.

In the illustrated embodiment, file system 205 provides a programming-language independent query interface 330 whereby an application may query file system content. In one embodiment, query interface 330 may be implemented as a query language interpreter configured to receive a query from an application and to perform the necessary actions to establish a connection to query engine 340, negotiate privileges, submit a query to query engine 340, and convey query results to the requesting application. For example, query interface 330 may be implemented in a manner similar to a shell script interpreter, such as the perl or csh script interpreters commonly used in Unix/Linux-type environments. In one such embodiment, an application may write a specific query to a text file and then cause that text file to be interpreted by query interface 330. In another embodiment, an application may establish an interactive session with query interface 330 and may send a query directly to query interface 330 without writing the query to a file first.

For example, a given application may seek to retrieve all of the metadata stored in a named stream 320a associated with a given file 310a having the identity "/test1/spreadsheet.xls". In one embodiment, the application may create a text file named, for example, "ls_meta.vxq" that includes the following contents:

```
#!/usr/lib/fs/cas/bin/vxq -x
xquery version "1.0"
default element namespace = "http://veritas.com/casmeta"
define function current($m1 as element(filemeta)*) as
    element(record)* {
        for $i in $m1
        return
            let $maxseqno := max($i/record/@sequence)
            return $i/record[@sequence = $maxseqno]
}
```

-continued

```
let $path := "/test1/spreadsheet.xls"
return current(/filemeta)/path[. = $path]/ancestor::filemeta
```

The application may cause these contents to be written to the file in any of a number of ways. For example, the application may directly create and write to the file using file create and write commands included in a file I/O API, such as API 214 of FIG. 2. Alternatively, the application may invoke a text editor and indirectly write the file contents through the text editor. In still another instance, a user may invoke a text editor directly to create such a file.

In the illustrated example, the first line of the file "ls_meta.vxq" may specify the location of the query interface 330 that should be invoked to interpret the remainder of the file. In this case, query interface 330 is implemented as an executable application or shell named "vxq", although it may have any name. The remainder of the file specifies a file system content query composed in the XQuery language. The query includes a definition of a function procedure current( ) that is configured to select the most current record within the metadata stored in a named stream 320, defined as the record with the highest sequence number. The query further applies the current( ) function to the metadata stored in the named stream 320 associated with the file "/test1/spreadsheet.xls" to select its most current record, and then applies the "ancestor" operator to return the entire metadata stream (i.e., all records) in which the most current record resides. Thus, the query results in returning all metadata in named stream 320a associated with file 310a, "/test1/spreadsheet.xls". Numerous variants of this query are possible and contemplated, as are numerous other possible queries.

After writing the foregoing contents into a text file, in one embodiment the application may cause the text file to be executed. For example, in some embodiments, various programming language environments may provide a generic system call that may allow programs external to an application to be invoked. In one such embodiment, where the querying application is coded in C, the example text file shown above may be invoked by the function call system(ls_meta.vxq). A relative or complete path to file "ls_meta.vxq" may be provided in some instances. Alternatively, if a user is directly editing the contents of file "ls_meta.vxq", such as via a text editor, the user may cause the text file to be executed by entering the file name at a command line prompt. It is noted that in some embodiments, a user or application may need to ensure that the text file including the query to be submitted has an executable file attribute prior to attempting to execute the file.

When a text file such as "ls_meta.vxq" is executed, the first line of the file may be examined by the operating system to determine if it specifies an interpreter intended to process the remainder of the file. In one embodiment, upon encountering a specification of the "vxq" interpreter, query interface 330 may be invoked. Subsequently, query interface 330 may establish a connection to query engine 340 and perform any other preliminary steps needed to submit a query to query engine 340, such as authentication, for example. Following these steps, query interface 330 may cause the remainder of the file (i.e., the query) to be submitted to query engine 340.

After query engine 340 evaluates a submitted query, it may generate output. For example, the query illustrated above may yield a sequence of metadata records when evaluated. Alternatively, if the query is malformed (i.e., syntactically incorrect), if query interface 330 was unable to establish a connection to query engine 340 (e.g., due to a system or authentication failure), or if some other exceptional condition occurs, an error condition may be generated. In either case, query interface 330 may be configured to convey the query output or error condition to the querying application. In some embodiments, such output or error information may be displayed on a display device, logged to an output or error file, or returned as text data directly to an application for further processing, or some combination of these or other behaviors.

In the foregoing discussion, query interface 330 was invoked by specifying a query language interpreter in a text file, along with a query, and then executing the text file. However, in other embodiments, query interface 330 may be invoked more directly. For example, in one embodiment, an application may create a file including a query but omitting specification of an interpreter (i.e., omitting the line beginning with "#!" in the example shown above). The application may then directly invoke query interface 330 by calling the command interpreter, and may pass the text file including the query to the command interpreter as a parameter or by redirecting the input stream of the command interpreter. For example, rather than invoking the system(ls_meta.vxq) call illustrated above, a C application may submit a query by invoking the call system("vxq−x−i ls_meta.vxq") or the call system("vxq−x<ls_meta.vxq"), or a similar call depending on the application's programming language and the conventions for passing parameters to or redirecting input of query interface 330.

Regardless of the exact manner in which query interface 330 is invoked, it is noted that an application may submit a query to query engine 340 via query interface 330 without being aware of interface syntax or semantics beyond the technique used to invoke query interface 330. That is, for submitting a query in some embodiments, an application need only be aware of the syntax and semantics of the query language supported by query engine 340, such as XQuery, for example. In such embodiments, further details regarding query submission may be handled by query interface 330 in a manner transparent to the querying application.

In some embodiments of file system 205, query interface 330 may support applications running on different operating system platforms. For example, query interface 330 may support query submissions from Windows-based applications as well as Unix/Linux-based applications, or from other types of applications. In one such embodiment, file system 205 may provide a separate instance of query interface 330 native to each supported platform. In another embodiment, query interface 330 may be implemented in a platform-independent language. For example, query interface 330 may be implemented in Java and executed in a Java Virtual Machine provided by each platform. In yet another embodiment, a given platform may implement separate utilities to provide cross-platform functionality, enabling the given platform to use a version of query interface 330 implemented for a different platform. For example, in one embodiment query interface 330 may be implemented as a Unix-type shell interpreter. A Windows platform including the Windows Services for Unix utilities, or similar cross-platform utilities, may be capable of executing Unix-style shell scripts. Such a Windows platform may thereby directly interact with query interface 330, without necessitating a native Windows version of that interface. Also, it is noted that like query engine 340, in one embodiment query interface 330 may be configured to operate in the user space illustrated in FIG. 2, rather than in kernel space.

It is contemplated that in some embodiments, query interface 330 may be configured to accept parameters or arguments that a querying application may specify when invoking the interface. For example, in one embodiment query interface 330 may accept optional arguments that enable various levels of debugging output or verbosity of returned status messages. In another embodiment, query interface 330 may accept optional arguments that specify how query input and output should be handled, e.g., read from or written to specific files or devices. However, it is contemplated that in some embodiments where query interface 330 is configured to accept parameters, an application may be able to submit a query without specifying such parameters.

Additionally, it is contemplated that in one embodiment, query interface 330 and query engine 340 may be configured to inherit the general security model implemented by the file system. That is, a given application's privileges regarding the type of file system content it may access via a query may be governed by the general file access privileges established by the file system, such that a given query may be performed contingently based upon the security model provided by file system 205. For example, file system 205 may establish a system of privileges based on file ownership and file permissions, such that a user (or an application executing with a user's identity and/or privileges) may only have access to certain files owned by the user or for which the user has been granted access privileges by the owner. File system 205 may reject an attempt by a user or application to access file system content for which the user or application is not privileged. Similarly, query interface 330, query engine 340, or another module of file system 205 may be configured to assess the file system content requested by a given query in light of the querying application's privileges as established by file system 205 generally, and may reject an attempt to query file system content for which the querying application is insufficiently privileged. It is contemplated that in various embodiments, file system 205 may implement numerous other types of security models that may be inherited by the query environment.

Figure 4:
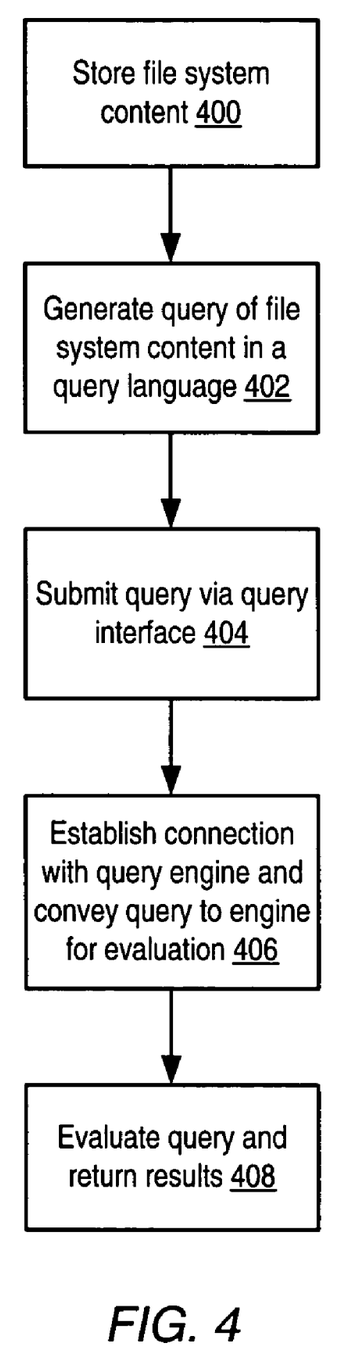
FIG. 4 is a flow diagram illustrating one embodiment of a method of querying file system content via a programming-language-independent interface.

FIG. 4 illustrates one embodiment of a method of querying file system content via a programming-language-independent interface. Referring collectively to FIG. 1 through FIG. 4, operation begins in block 400 where file system content, such as file data or metadata corresponding to a given file, is stored. For example, in one embodiment filter driver 221 may be configured to store metadata in a named stream 320 corresponding to a given file 310 subsequent to detecting a particular file operation on given file 310.

Subsequently, a given application or process may generate a query of file system content in a particular query language (block 402). For example, the application or process may generate a query of XML-format file system content in the XQuery language. In one embodiment, the application or process may cause the query to be written to a file, which in another embodiment, the query may be buffered internally to the application.

After generating the query, the given application or process may submit the query to query engine 340 via query interface 330 (block 404). For example, as variously described above, the given application may directly or indirectly invoke query interface 330 as a shell-type interpreter and may cause query interface 330 to read a file including the query or to receive the query directly through interprocess communication techniques such as streams or buffers.

Upon receiving a submitted query, query interface 330 may be configured to establish a connection with query engine 340 and convey the query to query engine 340 for evaluation (block 406). In some embodiments, query engine 340 may also be configured to establish that the querying application is authorized to submit a query, such as by evaluating a security model inherited from file system 205. In other embodiments, such authentication may be performed by a different software module at a different step.

Query engine 340 may then evaluate the submitted query and return results and/or exceptional status, such as error conditions, to the querying application via query interface 330 (block 408). In some embodiments, query engine 340 may cause results to be written to a file, such as an output file specified by the querying application or a default output file, while in other embodiments the results may be returned directly to the querying application through interprocess communication techniques.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
  a storage device configured to store a plurality of files; and
  a host device configured to implement a file system, wherein the file system is configured to manage access to said storage device and to store file system content on said storage device, wherein said file system content comprises metadata stored in Extensible Markup Language (XML) format, wherein said file system comprises a programming-language-independent interface configured to receive a query directed to said file system content from an application, wherein said programming-language-independent interface is further configured to receive said query from said application without dependence on a programming language in which said application is implemented;
  wherein said programming-language-independent interface comprises a program that is executable by said host device in response to a generic system call by said application, wherein said generic system call is executable by said application with one or more parameters that specify one or more programs external to said application, wherein said generic system call is further executable to cause said one or more programs external to said application to be executed by said host device.

2. The system as recited in claim 1, wherein said file system content comprises file data stored in one or more of said plurality of files.

3. The system as recited in claim 1, wherein said file system content comprises metadata stored in a named stream corresponding to a given file.

4. The system as recited in claim 1, wherein in response to being invoked by said generic system call, said programming-language-independent interface is executable to read said query from a text file.

5. The system as recited in claim 1, wherein in response to being invoked by said generic system call, said programming-language-independent interface is executable to read said query dependent upon command-line parameters associated with said generic system call.

6. The system as recited in claim 1, wherein said file system implements a security model, and wherein said file system is further configured to evaluate application queries of said file system content contingently dependent upon said security model.

7. The system as recited in claim 1, wherein said programming-language-independent interface is further configured to allow each of a plurality of applications to query said file system content, wherein at least two of said plurality of applications are implemented in different programming languages.

8. A method, comprising:
  a file system storing file system content on a storage device configured to store a plurality of files, wherein said file system is implemented by a host device, and wherein said file system content comprises metadata stored in Extensible Markup Language (XML) format;
  an application executing a generic system call with a parameter specifying a programming-language independent interface, wherein the programming-language independent interface comprises an executable program external to said application, wherein the generic system call is executable by said application with one or more parameters that specify one or more programs external to said application, wherein said generic system call is further executable to cause said one or more programs external to said application to be executed by said host device;
  in response to said application executing said generic system call, said programming-language-independent interface receiving a query directed to said file system content from said application, wherein said receiving occurs without dependence on a programming language in which said application is implemented.

9. The method as recited in claim 8, wherein said file system content comprises file data stored in one or more files.

10. The method as recited in claim 8, wherein said file system content comprises metadata stored in a named stream corresponding to a given file.

11. The method as recited in claim 8, wherein said programming-language-independent interface receiving said query further comprises said programming-language-independent interface reading said query from a text file.

12. The method as recited in claim 8, wherein said programming-language-independent interface receiving said query further comprises said programming-language-independent interface reading said query dependent upon command-line parameters associated with said generic system call.

13. The method as recited in claim 8, further comprising said file system evaluating application queries of said file system content dependent upon a security model implemented by said file system.

14. The method as recited in claim 8, further comprising each of a plurality of applications querying said file system content via said programming-language-independent interface, wherein at least two of said plurality of applications are implemented in different programming languages.

15. A tangible, computer-accessible storage medium comprising program instructions, wherein the program instructions are computer-executable to implement a file system configured to:
  store file system content on a storage device configured to store a plurality of files, wherein said file system content comprises metadata stored in Extensible Markup Language (XML) format; and
  present a programming-language-independent interface to an application, wherein said programming-language-independent interface is configured to receive a query directed to said file system content from said application without dependence on a programming language in which said application is implemented;
  wherein said programming-language-independent interface comprises a program that is executable by said host device in response to a generic system call by said application, wherein said generic system call is executable by said application with one or more parameters that specify one or more programs external to said application, wherein said generic system call is further executable to cause said one or more programs external to said application to be executed by said host device.

16. The computer-accessible storage medium as recited in claim 15, wherein said file system content comprises file data stored in one or more files.

17. The computer-accessible storage medium as recited in claim 15, wherein said file system content comprises metadata stored in a named stream corresponding to a given file.

18. The computer-accessible storage medium as recited in claim 15, wherein said program instructions are further executable to implement a security model and to evaluate application queries of said file system content dependent upon said security model.

19. The computer-accessible storage medium as recited in claim 15, wherein said programming-language-independent interface is further configured to allow each of a plurality of applications to query said file system content, wherein at least two of said plurality of applications are implemented in different programming languages.

20. A system, comprising:
a storage device configured to store a plurality of files; and
a host device configured to implement a file system, wherein the file system is configured to manage access to said storage device and to store file system content on said storage device, wherein said file system comprises an XML Query (XQuery) query language interface configured to receive a query directed to said file system content from an application, wherein said file system content comprises metadata stored in Extensible Markup Language (XML) format;
wherein said XQuery query language interface comprises a program that is executable by said host device in response to a generic system call by said application, wherein said generic system call is executable by said application with one or more parameters that specify one or more programs external to said application, wherein said generic system call is further executable to cause said one or more programs external to said application to be executed by said host device.

* * * * *